United States Patent
Ha et al.

(10) Patent No.: US 9,569,091 B2
(45) Date of Patent: Feb. 14, 2017

(54) TEXT INPUT METHOD IN TOUCH SCREEN TERMINAL AND APPARATUS THEREFOR

(71) Applicant: Samsung Electronics Co., Ltd, Gyeonggi-do (KR)

(72) Inventors: Tae-Gon Ha, Seoul (KR); Hairong Zhang, Guangzhou (CN)

(73) Assignee: SAMSUNG ELECTRONICS CO., LTD, Suwon-si, Gyeonggi-Do (KR)

( * ) Notice: Subject to any disclaimer, the term of this patent is extended or adjusted under 35 U.S.C. 154(b) by 95 days.

(21) Appl. No.: 13/678,323

(22) Filed: Nov. 15, 2012

(65) Prior Publication Data

US 2013/0120274 A1  May 16, 2013

(30) Foreign Application Priority Data

Nov. 15, 2011  (KR) .................. 10-2011-0118958

(51) Int. Cl.
*G06F 3/0488* (2013.01)
*G06F 3/01* (2006.01)

(52) U.S. Cl.
CPC .......... *G06F 3/0488* (2013.01); *G06F 3/04883* (2013.01); *G06F 3/018* (2013.01)

(58) Field of Classification Search
CPC .... G06F 3/0488; G06F 3/04883; G06F 3/018; G06F 3/0237; G06F 17/276
See application file for complete search history.

(56) References Cited

U.S. PATENT DOCUMENTS

| | | | | |
|---|---|---|---|---|
| 7,369,702 | B2 * | 5/2008 | Abdulkader et al. | 382/187 |
| 8,547,354 | B2 * | 10/2013 | Koch et al. | 345/173 |
| 2006/0033719 | A1 * | 2/2006 | Leung et al. | 345/168 |
| 2006/0044259 | A1 * | 3/2006 | Hotelling | G06F 1/1616 345/156 |
| 2007/0075978 | A1 * | 4/2007 | Chung | 345/173 |
| 2007/0091070 | A1 * | 4/2007 | C. Larsen | G06F 3/0213 345/168 |
| 2011/0246927 | A1 | 10/2011 | Im | |

(Continued)

FOREIGN PATENT DOCUMENTS

| | | |
|---|---|---|
| CN | 101118472 A | 2/2008 |
| CN | 101620480 A | 1/2010 |

(Continued)

OTHER PUBLICATIONS

First Office Action dated Feb. 3, 2015 in connection with Chinese Patent Application No. 2012104281185; 31 pages.

(Continued)

*Primary Examiner* — Quan-Zhen Wang
*Assistant Examiner* — Xuemei Zheng

(57) ABSTRACT

A method and an apparatus input test in a touch screen terminal. The method comprises designating a certain region on a keyboard interface picture, not permitting text input through a keyboard when touch drag started from the designated region is sensed and acquiring a path of the touch drag, acquiring a path of following touch drag when at least the one or more following touch drag are sensed, and reading out at least the acquired one or more paths by cursive character recognition, deducing a character, determining the deduced character as an input target, and permitting the text input through the keyboard.

17 Claims, 4 Drawing Sheets

(56) References Cited

U.S. PATENT DOCUMENTS

| | | | |
|---|---|---|---|
| 2012/0056814 A1* | 3/2012 | Sudo | 345/168 |
| 2012/0113023 A1* | 5/2012 | Koch et al. | 345/173 |
| 2012/0242579 A1* | 9/2012 | Chua | 345/168 |

FOREIGN PATENT DOCUMENTS

| | | |
|---|---|---|
| CN | 102033682 A | 4/2011 |
| CN | 102193736 A | 9/2011 |
| KR | 10-2000-0024489 | 5/2000 |
| KR | 10-2001-0096061 | 11/2001 |
| KR | 10-2011-0072818 | 6/2011 |
| KR | 10-2011-0072819 | 6/2011 |

OTHER PUBLICATIONS

Translation of Chinese Second Office Action, dated Sep. 22, 2015, in connection with Chinese Patent Application No. 2012104281185, 28 pages.

Third Office Action dated Mar. 23, 2016 in connection with Chinese Patent Application No. 2012104281185; 27 pages.

* cited by examiner

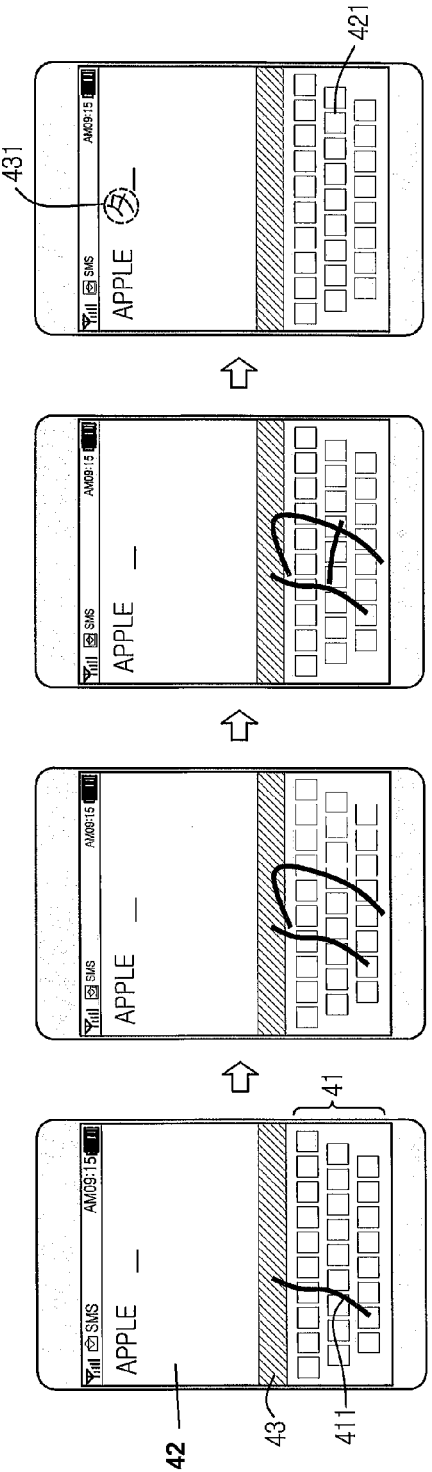

TEXT INPUT METHOD IN TOUCH SCREEN TERMINAL AND APPARATUS THEREFOR

CROSS-REFERENCE TO RELATED APPLICATION(S) AND CLAIM OF PRIORITY

The present application is related to and claims the benefit under 35 U.S.C. §119(a) of a Korean patent application filed in the Korean Intellectual Property Office on Nov. 15, 2011 and assigned Serial No. 10-2011-0118958, the entire disclosure of which is hereby incorporated by reference.

TECHNICAL FIELD OF THE INVENTION

The present disclosure relates to a text input method in a touch screen terminal and an apparatus therefor.

BACKGROUND OF THE INVENTION

Portable terminals such as mobile terminals (cellular phones), electronic schedulers, and personal complex terminals have become necessities of current society based on development of electronic communication industries. The portable terminals have developed into important means of information transmission, which are quickly changed.

As everyone knows, recently, because utilization of a touch screen portable terminal is enhanced, the trend in a text input type is toward a text input method through a touch screen.

FIG. 1 illustrates interface pictures for text input in a conventional touch screen portable terminal.

Referring to FIG. 1, the touch screen portable terminal provides a keyboard interface picture and a cursive character recognition interface picture. The keyboard interface picture includes a keyboard 11 and an input window 13 for displaying characters received through the keyboard 11. Also, the cursive character recognition interface picture includes a cursive character recognizer 14 for receiving touch drag and an input window 15 for reading out the touch drag and displaying a deduced character.

In general, a user must convert and use the keyboard interface picture and the cursive character recognition interface picture. Therefore, this results in an inconvenience to the user.

SUMMARY OF THE INVENTION

To address the above-discussed deficiencies of the prior art, it is a primary object to provide a method and apparatus for permitting text input using a keyboard and cursive character recognition.

Another aspect of the present disclosure is to provide a method and apparatus for permitting text input using cursive character recognition on a keyboard interface display or picture.

In accordance with an aspect of the present disclosure, a text input method in a touch screen terminal is provided. The text input method includes designating a certain region on a keyboard interface display or picture, not permitting text input through a keyboard when touch drag started from the designated region is sensed and acquiring a path of the touch drag, acquiring a path of following touch drag when at least the one or more following touch drag are sensed, and reading out at least the acquired one or more paths by cursive character recognition, deducing a character, determining the deduced character as an input target, and permitting the text input through the keyboard.

In accordance with another aspect of the present disclosure, a text input apparatus in a touch screen terminal is provided. The text input apparatus includes a controller for designating a certain region on a keyboard interface display or picture, not permitting text input through a keyboard when touch drag started from the designated region is sensed, and acquiring a path of the touch drag, wherein the controller acquires a path of following touch drag when at least the one or more following touch drag is sensed and wherein the controller reads out at least the acquired one or more paths by cursive character recognition, deduces a character, determines the deduced character as an input target, and permits the text input through the keyboard.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 4A to 4E illustrate interface displays or pictures for text input according to various embodiments of the present disclosure.

DETAILED DESCRIPTION OF THE INVENTION

FIGS. 2 through 4E, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device. Exemplary embodiments of the present disclosure will be described herein below with reference to the accompanying drawings. In the following description, well-known functions or constructions are not described in detail since they would obscure the invention in unnecessary detail. Also, the terms used herein are defined according to the functions of the present disclosure. Thus, the terms may vary depending on user's or operator's intension and usage. That is, the terms used herein must be understood based on the descriptions made herein.

The present disclosure described hereinafter relates to a method and apparatus for permitting text input using a keyboard and cursive character recognition without converting an interface picture.

Figure 1:
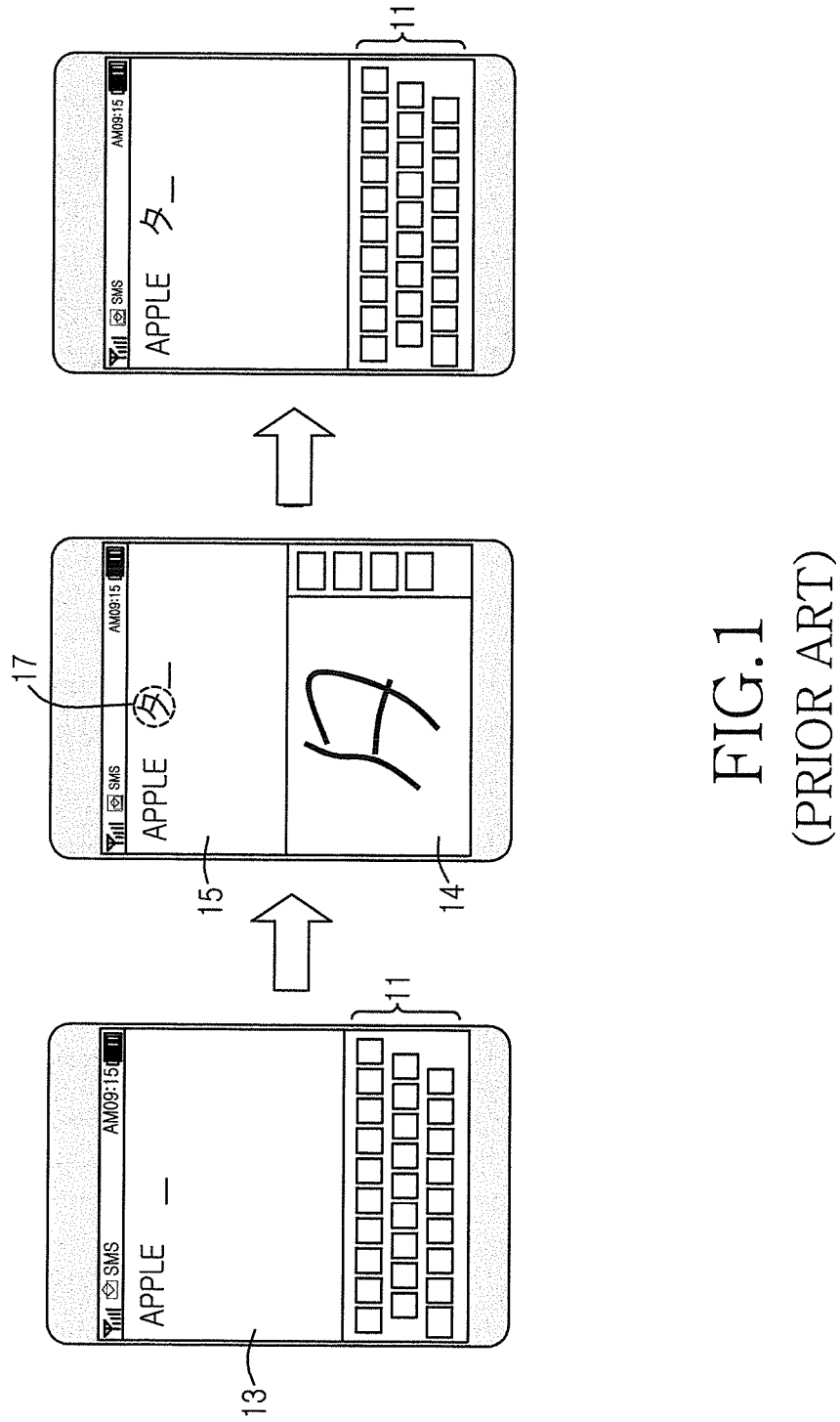
FIG. 1 illustrates interface pictures for text input in a conventional touch screen portable terminal.
Figure 2:
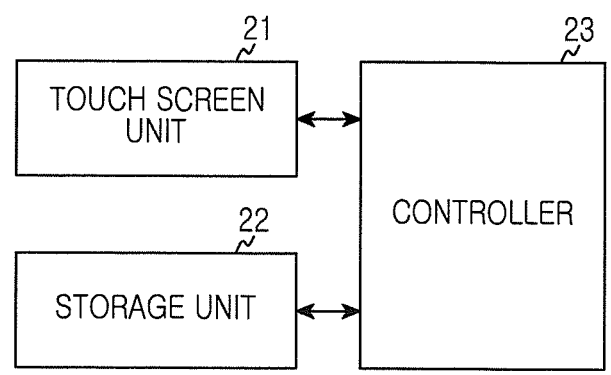
FIG. 2 illustrates a block diagram of a portable terminal according to one embodiment of the present disclosure.

FIG. 2 illustrates a block diagram of a portable terminal according to one embodiment of the present disclosure.

Referring to FIG. 2, the portable terminal includes a touch screen unit 21, a storage unit 22, and a controller 23.

The touch screen unit 21 receives an output signal and outputs the received output signal as an image under control of the controller 23. In addition, the touch screen unit 21 receives touch of a user and outputs an input signal to the controller 23. The controller 23 performs an operation according to the input signal.

The storage unit 22 stores programs for controlling an overall operation of the portable terminal and a variety of data items input and output when a control operation of the portable terminal is performed.

The controller 23 controls an overall operation of the portable terminal.

Hereinafter, a method of inputting characters in the controller 23 according to one embodiment of the present disclosure will be described in detail.

Figure 3:
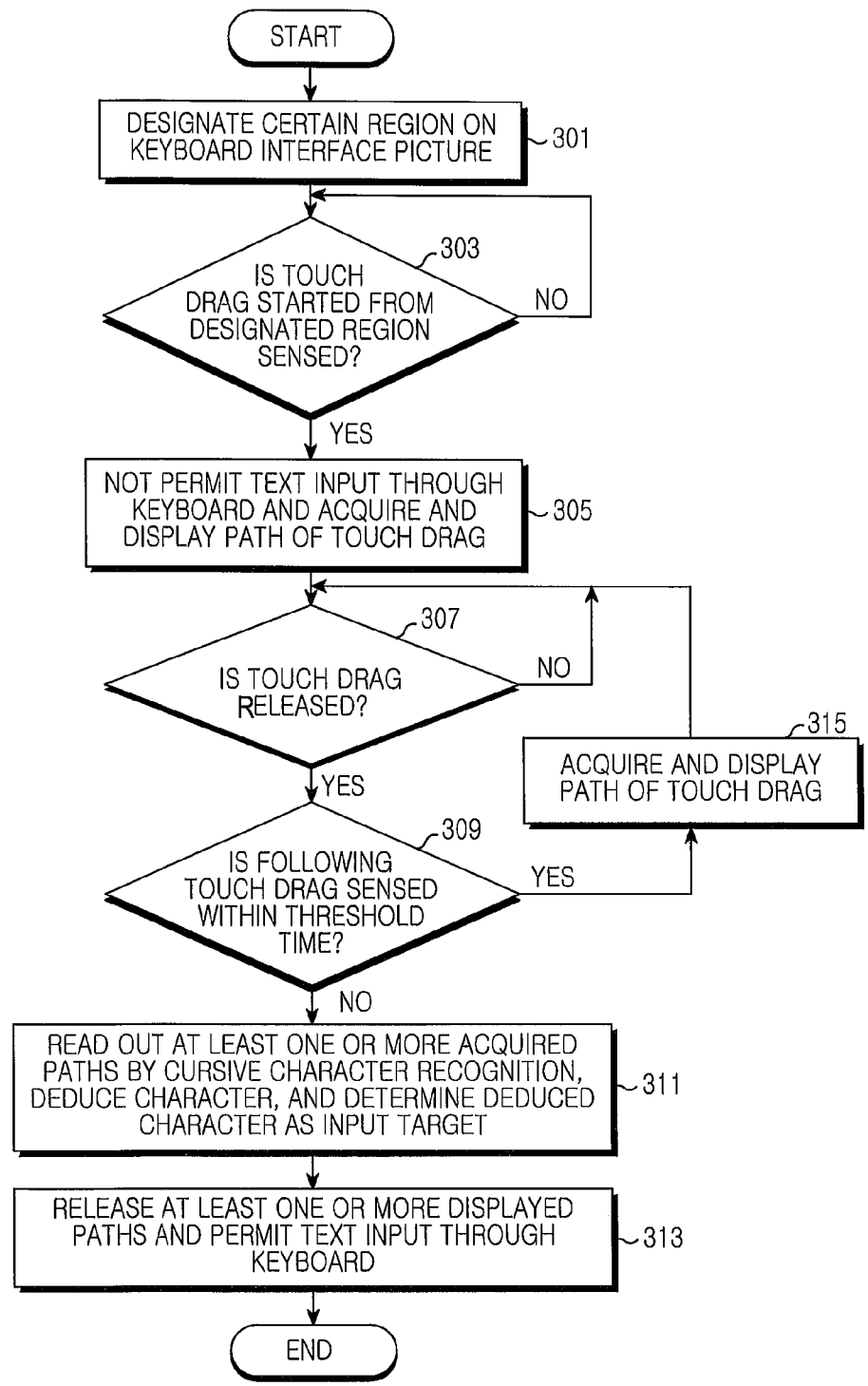
FIG. 3 illustrates a process of inputting characters according to one embodiment of the present disclosure.

FIG. 3 illustrates a process of inputting characters according to one embodiment of the present disclosure.

Referring to FIG. 2 and FIG. 3, the controller 23 designates a certain region on a keyboard interface display or picture in step 301. The controller 23 may allow a user to determine a range or position of the region.

When touch drag started from the designated region is sensed in step 303, the controller 23 proceeds to step 305, does not permit text input through a keyboard, and acquires and displays a path of the touch drag. For example, the touch drag started from the designated region may or may not be gotten out of the designated region.

When release of the touch drag is sensed in step 307, the controller 23 proceeds to step 309 and verifies whether there is following touch drag within a threshold time. When the following touch drag is sensed within the threshold time in step 309, the controller 23 proceeds to step 315 and acquires and displays a path of the following touch drag. The controller 23 performs the processing from step 307.

When the following touch drag is no longer sensed within the threshold time in step 309, the controller 23 proceeds to step 311, reads out at least the one or more acquired paths by cursive character recognition, deduces a character, and determines the deduced character as an input target. For example, the controller 23 displays the deduced character on an input window of the keyboard interface display or picture in step 311.

The controller 23 releases at least the one or more displayed paths and permits text input through the keyboard in step 313.

When the path of the touch drag is displayed, the controller 23 displays the path of the touch drag on the keyboard interface picture. For example, the controller 23 may display the path of the touch drag on an overlay display or picture or may display the path of the touch drag on the keyboard interface display or picture itself.

FIG. 4A to 4E illustrate interface displays or pictures for text input according to various embodiments of the present disclosure.

Referring to FIG. 2 and FIG. 4A to 4E, the controller 23 provides a keyboard 41 and an input window 42 for displaying characters input through the keyboard 41. In addition, the controller 23 provides a designated region 43 arranged with the keyboard 41 and the input window 42.

As shown (a) of FIG. 4, a user starts touch drag 411 from the designated region 43. The controller 23 does not permit text input through a keyboard and performs cursive character recognition.

As shown (a) to (c) of FIG. 4, when the cursive character recognition is performed, the controller 23 acquires at least one or more paths of the touch drag, reads out the acquired paths, and deduces a character. The controller 23 acquires at least one or more paths of the touch drag until the previous touch drag is released and there are no longer touch drag within a threshold time. Particularly, the controller 23 displays a sensed path of the touch drag on a picture of the display of the keyboard 41, the input window 42, and the designated region 43. After (a) of FIG. 4, the controller 23 provides the entire picture as a region of the touch drag for the cursive character recognition.

As shown in (d) of FIG. 4, when there is no longer touch drag within the threshold hold after the previous touch drag is released, the controller 23 reads out at least the one or more acquired paths, deduces the character, and displays the deduced character 431 on the input window 42. In addition, the controller 23 permits text input through the keyboard 41 again. As shown (d) and (e) of FIG. 4, when a button 421 is touched, the controller 23 displays a mapped corresponding character 432 on the input window 42.

In conclusion, because text input using cursive character recognition is permitted on a keyboard interface picture, a text input method and an apparatus therefor according to one embodiment of the present disclosure solve the trouble of converting the keyboard interface display or picture into the cursive character recognition interface picture or converting the cursive character recognition interface picture into the keyboard interface picture.

It will be appreciated that embodiments of the present invention according to the claims and description in the specification can be realized in the form of hardware, software or a combination of hardware and software.

Any such software may be stored in a computer readable storage medium. The computer readable storage medium stores one or more programs (software modules), the one or more programs comprising instructions, which when executed by one or more processors in an electronic device, cause the electronic device to perforin a method of the present invention.

Any such software may be stored in the form of volatile or non-volatile storage such as, for example, a storage device like a ROM, whether erasable or rewritable or not, or in the form of memory such as, for example. RAM, memory chips, device or integrated circuits or on an optically or magnetically readable medium such as, for example, a CD, DVD, magnetic disk or magnetic tape or the like. It will be appreciated that the storage devices and storage media are embodiments of machine-readable storage that are suitable for storing a program or programs comprising instructions that, when executed, implement embodiments of the present invention.

Accordingly, embodiments provide a program comprising, code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

While the present disclosure has been particularly shown and described with reference to exemplary embodiments thereof, it will be understood by those skilled in the art that various changes in form and details may be made therein without departing from the spirit and scope of the present disclosure as defined by the appended claims.

What is claimed is:

1. A method to input a text in an electronic device including a touch screen, the method comprising:
    designating an input window, a keyboard, and a region on the touch screen;
    detecting whether a touch input is started from the keyboard or the designated region, wherein the designated region is a region on the touch screen having an area that is less than a total area of the touch screen;
    in response to detecting the touch input starting from the keyboard, detecting a key on the keyboard that corresponds to the detected touch input and identifying a first character that corresponds to the detected key;
    in response to detecting the touch input starting from the designated region, disabling a text input mode through the keyboard to allow the touch input to extend into the keyboard, acquiring at least one or more paths of the detected touch input, and identifying a second character using character recognition based on the acquired one or more paths; and
    inputting the first or second character in the input window.

2. The method of claim 1, further comprising displaying at least the one or more paths of the detected touch input.

3. The method of claim 2, further comprising removing a display of the at least one or more paths of the detected touch input after inputting the first or second character.

4. The method of claim 1, further comprising enabling the text input mode through the keyboard after inputting the second character that is identified using character recognition based on the acquired one or more paths.

5. The method of claim 1, wherein inputting the second character which is identified using character recognition based on the acquired one or more paths is performed in response to identifying that no touch input is sensed within a threshold time after a previous touch input is released.

6. The method of claim 1, further comprising resizing or repositioning the designated region in response to a request from a user input.

7. The method of claim 1, further comprising determining when the touch input is continued toward a new point on the touch screen that is out of the designated region from an original point of the designated region.

8. The method of claim 1, wherein the touch input is capable of being input via an entire region of the touch screen.

9. An electronic device comprising:
    a touch screen; and
    a controller configured to:
        designate an input window, a keyboard, and a region on the touch screen,
        detect whether a touch input is started from the keyboard or the designated region, wherein the designated region is a region on the touch screen having an area that is less than a total area of the touch screen,
        in response to detecting the touch input starting from the keyboard, detect a key on the keyboard that corresponds to the detected touch input and identify a first character that corresponds to the detected key,
        in response to detecting the touch input starting from the designated region, disable a text input mode through the keyboard to allow the touch input to extend into the keyboard, acquire at least one or more paths of the detected touch input, and identify a second character using character recognition based on the acquired one or more paths, and
        input the first or second character in the input window.

10. The electronic device of claim 9, wherein the controller is configured to display the at least one or more paths of the detected touch input.

11. The electronic device of claim 10, wherein the controller is configured to remove a display of the one or more paths of the detected touch input after inputting the first or second character.

12. The electronic device of claim 9, wherein the controller is configured to enable the text input through the keyboard after inputting the second character which is identified using character recognition based on the acquired one or more paths.

13. The electronic device of claim 9, wherein the controller is configured to input the second character which is identified using character recognition based on the acquired one or more paths in response to identifying that no touch input is sensed within a threshold time after a previous touch input is released.

14. The electronic device of claim 9, wherein the controller is configured to resize or reposition the designated region in response to a request from a user input.

15. The electronic device of claim 9, wherein the controller is configured to determine when the touch input is continued toward a new point on the touch screen that is out of the designated region from an original point of the designated region.

16. The electronic device of claim 9, wherein the touch input is capable of being input via an entire region of the touch screen.

17. An electronic device, comprising:
    a touch screen; and
    a controller configured to:
        designate an input window, a keyboard, and a region on the touch screen,
        detect whether a touch input is started from the keyboard or the designated region, wherein the designated region is a region on the touch screen having an area that is less than a total area of the touch screen,
        in response to detecting the touch input starting from the keyboard, detect a key on the keyboard that corresponds to the detected touch input and identify a first character that corresponds to the detected key,
        in response to detecting the touch input starting from the designated region, disable a text input mode through the keyboard, acquire at least one or more paths of the detected touch input on the keyboard and the designated region, and identify a second character using character recognition based on the acquired one or more paths, and
        input the first or second character in the input window.

* * * * *